UNITED STATES PATENT OFFICE.

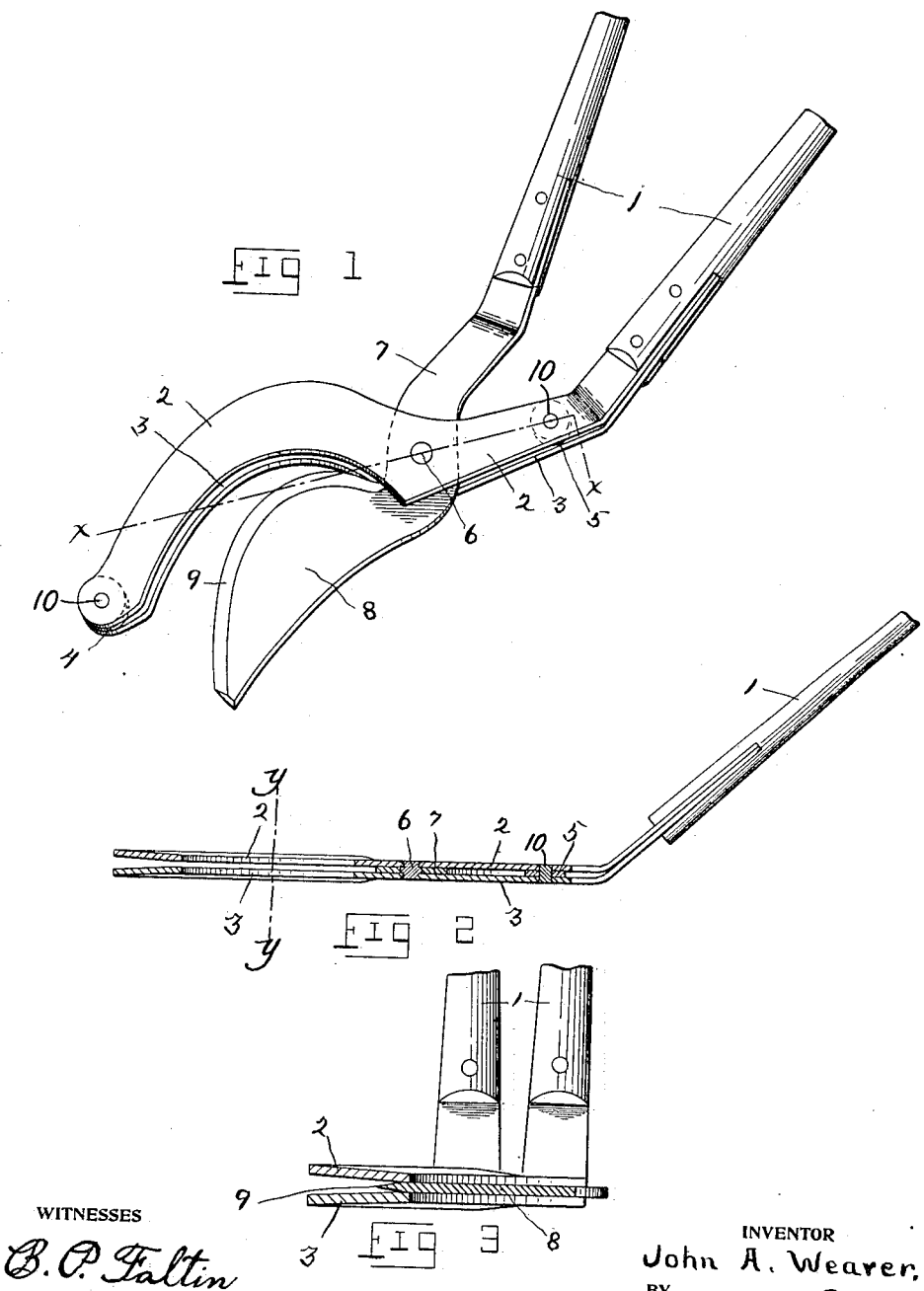

JOHN A. WEAVER, OF GAP, PENNSYLVANIA.

TOBACCO-SHEARS.

1,091,607.  Specification of Letters Patent.  Patented Mar. 31, 1914.

Application filed November 13, 1911.  Serial No. 659,982.

*To all whom it may concern:*

Be it known that I, JOHN A. WEAVER, a citizen of the United States, residing at Gap, in the county of Lancaster and State of Pennsylvania, have invented certain new and useful Improvements in Tobacco-Shears, of which the following is a specification, reference being had therein to the accompanying drawing.

This invention relates to a tobacco or pruning shears such as are employed in the cutting of tobacco, and in this connection it may here be stated that the usual shears employed for this purpose comprise a grasping arm having a cutter arm and blade pivoted thereto in such a manner that the blade slides over the upper surface of the grasping arm in effecting the cutting operation. In this construction the blade becomes sprung or bent, thus affecting the cutting qualities and rendering the implement useless.

The object of my invention is to provide a shears of this class in which the cutter can never become sprung or lose its contact cutting relations with the grasping arm.

Another object of the invention is to produce a pruning shears that shall be cheap, durable and efficient.

With these and other objects in view, my invention consists in a certain construction and combination of parts as will hereinafter be fully described and claimed in the annexed specification and illustrated in the accompanying drawings which form a part of this application and in which like figures of reference refer to corresponding parts in all of the views; but it is fully understood that while I have here described my invention as shown, that I do not confine myself to the exact design, as slight changes may be made in the construction and arrangement of the several parts without departing from the spirit of the invention.

In the drawings: Figure 1, is a perspective view of my improved shears. Fig. 2, is a sectional view of the same taken on the line X—X of Fig. 1. Fig. 3, is a cross-sectional view of the shears in a closed position taken on the line Y—Y of Fig. 2.

Referring to the drawings: The article comprises a grasping member and a cutting member pivoted together and supplied with the handles 1. The grasping member is formed of the upper and lower parts 2, and 3, respectively, which are spaced apart by the washers 4, and 5, and held together by the rivets 10, which pass through the washers and retain them rotatably between the parts 2, and 3. Between said parts 2, and 3, is pivoted at 6, the cutting member 7, which is formed with the blade 8, having a V-shaped cutting edge 9, and adapted to enter the space between the parts 2, and 3, in a cutting manner, as shown in Fig. 3. The parts 2, and 3, are slightly twisted or beveled outward on the rear side of the grasping member to afford a ready clearance for any matter forced in between by the blade. It will thus be seen that the blade is always guided and prevented from being sprung by the two-part grasping member, and the V-shaped cutting edge effects an easy and clean cut of the stalk.

Having thus described my invention what I claim as new and desire to secure by Letters Patent is:—

A pair of shears providing a grasping member and a cutting member said grasping member comprising two independent parts equal in length, spaced apart and riveted intermediate their length and at their outer ends, their inner ends converging and meeting, said cutting member pivoted between the parts at a point between the rivets, said parts between said pivot point and the outer rivet being bent so that their horizontal planes are at an angle to each other throughout their width.

In testimony whereof I affix my signature in presence of two witnesses.

JOHN A. WEAVER.

Witnesses:
 DILLER HERSHEY,
 FLETCHER WEAVER.

Copies of this patent may be obtained for five cents each, by addressing the "Commissioner of Patents, Washington, D. C."